United States Patent [19]

Fremont et al.

[11] Patent Number: 4,581,843
[45] Date of Patent: Apr. 15, 1986

[54] FOOT SNARE LIVE TRAP

[76] Inventors: Alphonse D. Fremont, Candle Lake, Saskatchewan, Canada, S0J 3E0; Gordon J. Steil, Box 76, Beaumont, Alberta, Canada, T0C 0H0

[21] Appl. No.: 650,688

[22] Filed: Sep. 17, 1984

[51] Int. Cl.[4] .......................................... A01M 23/34
[52] U.S. Cl. ...................................................... 43/87
[58] Field of Search ................................ 43/87, 86, 85

[56] References Cited

U.S. PATENT DOCUMENTS

| 1,012,386 | 12/1911 | Mainland | 43/87 |
| 3,060,623 | 10/1962 | Aldrich | 43/87 |
| 4,171,589 | 10/1979 | Brownlie | 43/87 |
| 4,389,807 | 6/1983 | Novak | 43/87 |

FOREIGN PATENT DOCUMENTS

| 1117759 | 2/1982 | Canada | 43/85 |
| 364029 | 12/1931 | United Kingdom | 43/87 |
| 2123667 | 2/1984 | United Kingdom | 43/87 |

Primary Examiner—Gene P. Crosby
Attorney, Agent, or Firm—Ernest Peter Johnson

[57] ABSTRACT

A trap having an eye is provided on the free end of the upper arm. A cable is secured to the free end of the lower arm and extends through the eye, so as to be slidably connected with the end of the upper arm. A slip noose is formed at the free end of the cable, which noose can be positioned to overlie the trigger. When the catch member is released, the upper arm throws the noose upwardly and simultaneously tightens the loop onto the paw of the animal. Because the cable remains attached to the two free ends of the now angularly disposed arms, and is free to slide through the eye, the jerking pulls of the snared animal on the end of the cable will merely cause the arms to be pulled part way together, against the resistance of the coil spring. Thus the animal is not jerking on a cable attached to a rigid anchor, and thus will not injure itself.

3 Claims, 3 Drawing Figures

FOOT SNARE LIVE TRAP

BACKGROUND OF THE INVENTION

1. Field of the Invention

The invention relates to a foot snare-type trap for the live trapping of animals.

2. Prior Art

The trapping of animals for their pelts, whether by live or killing traps, is a long practised art. In recent years there has been much effort exercised toward trying to develop traps that are more humane than those which have heretofore been available.

The present invention has developed from one such effort. It is an improvement of an existing trap which is in wide use. This prior art trap is shown in U.S. Pat. No. 3,060,623 to J. R. Aldrich.

To provide the Aldrich trap, one forms a length of spring steel into two arms joined at one end by an integral coil spring. In the relaxed position, the arms are positioned about 90° apart. When in the cocked position, the upper arm lies close to and generally parallel to the lower arm, with the coil spring in a tensioned condition. A support member is attached to the free end of the lower arm, remote from the spring coil. This support member extends transverse to said lower arm. A pair of legs extend downwardly from the ends of the support member. In use, these legs are driven part way into the soil, so that the forward or free end of the lower arm is slightly elevated above the ground surface. A trigger member is rotatably mounted on the support member. This trigger member comprises an upstanding hook or catch member and a forwardly projecting pan member. To cock the device, the upper arm is forced down toward the lower arm until the two arms are generally parallel. The catch member is then hooked onto a finger positioned at the free end of the upper arm, to releasably lock the two arms close together in a parallel arrangement. The pan then projects forward of the trap. When the animal steps on the elevated pan, the latter rotates downwardly, thereby releasing the upper arm, which springs upwardly. A snare means is associated with the spring and trigger assembly. This snare means comprises two lengths of cable. The first length is formed into a small, fixed loop at one end, which is positioned over a downwardly bent hook attached to the trigger member. This first length of cable then passes over a second hook, secured to the forward end of the upper arm, and terminates in a slip noose which overlies the pan. A second length of cable is secured at one end, by a snap lock, to the fixed loop of the first length. At its other end, the second length is attached to an anchor, such as a tree. When an upper arm is released by rotation of the trigger, it throws the slip noose upwardly along the leg of the animal and simultaneously pulls on the cable, away from the noose, to draw the noose tight. A jam lock, forming part of the noose, prevents the latter enlarging, so that the cable remains tight on the animal's leg.

It is a fundamental feature of the Aldrich assemblage that the cable means be associated with open hooks on the spring device. Thus, when the animal is snared and begins jerking on the cable, the latter separates from the spring device, which is left to lie on the ground while the animal and cable means remain tied to the tree.

This arrangement results in a problem. The animal is now attached by a steel cable to a stationary anchor, such as a tree. The trapped animal commonly rushes out to the full extent of the cable and is then brought up short. This frequently results in injury to the animal and damage to the pelt, more particularly as the panicked animal again and again rushes back and forth from one side of the tree to the other.

SUMMARY OF THE INVENTION

In accordance with the invention, we have arranged for the slip noose cable to remain attached at all times, in use, to the free ends of the spring device arms. More particularly, one end of the cable is secured or tied to the free end of the lower arm. The cable body also passes through means, such as an eye attached to the free end of the upper arm, which means is adapted to retain the cable while permitting it to slip therethrough. The spring device is separately connected, by a second cable or the like, to the anchor.

As a result of this arrangement, the spring device functions as a resilient resister between the slip noose and the anchor. When the animal pulls on the cable, it can only partly pull the arms together, as this action is resisted by the coil spring. Therefore the animal is not tied directly to an unyielding anchor.

Testing of the trap in the field has indicated that, in 77% of the catches, the animal (coyote, wolf and bear) was unhurt and without broken skin.

Broadly stated, the invention is a foot snare live trap for snaring the paw of an animal, comprising: upper and lower arms connected at their first ends by a resilient coil spring, said arms being adapted to assume a wide angled disposition when the coil spring is relaxed; a catch support member connected with the lower arm at its second end; rotatable catch means, mounted on the catch support member, for disengageably locking the upper arm to the lower arm in a generally parallel arrangement with the coil spring in a tensioned condition, said catch means comprising a U-shaped bracket having a pair of spaced legs through which the support member extends, whereby the bracket may rotate on the support member, said bracket carrying a notched dog member for engaging the upper arm to lock it in the parallel arrangement; trigger means, extending forwardly from the catch means and connected therewith, for releasing said catch means when said trigger means is stepped on and rotated by an animal; means for supporting the outer end of the lower arm so that it is elevated relative to the ground, whereby there is clearance for the trigger means to perform its releasing function; said upper arm having a closed loop at its second end for retaining a cable while permitting it to slip therethrough; and a cable assembly, securable to the second end of the lower arm, and comprising a cable for extending through the closed hoop, said assembly comprising means at its outer end for forming the cable into a slip noose to overlie the trigger means; whereby, when a snared animal pulls on the noose end of the cable assembly, the cable assembly remains attached to the free ends of the arms and is operative to pull them toward each other against the resistance of the coil spring.

DESCRIPTION OF THE PREFERRED EMBODIMENT

Figure 1:
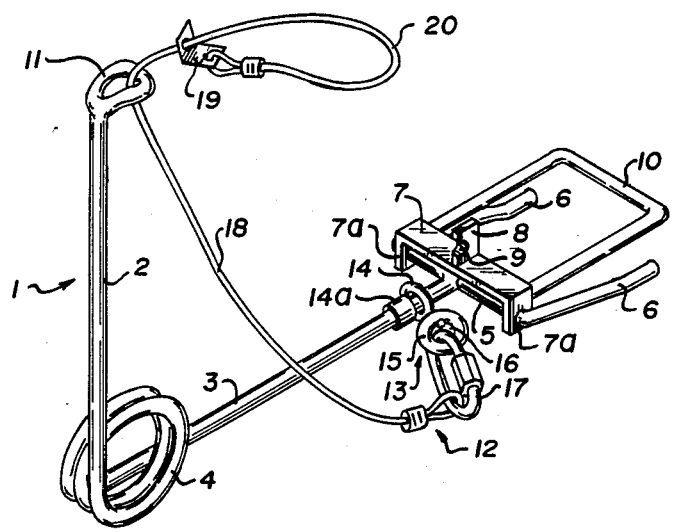
FIG. 1 is a perspective view of the trap with the arms in the released position.

The trap 1 comprises a length of spring steel rod formed to provide an upper arm 2, a lower arm 3 and a coil spring 4 connecting the two arms 2, 3. As shown in FIG. 1, when in the released or relaxed state, the arms 2, 3 assume a wide angled disposition (about 90°).

A catch support member 5 extends transversely of the lower arm 3 and is connected thereto at the free end thereof. The member 5 has a pair of spaced legs 6 extending forwardly and downwardly at a small angle from horizontal. Thus, when the trap is resting on the ground, the legs 6 function to elevate the forward end of the lower arm 3 to provide a clearance for rotation of the catch and trigger assembly.

A U-shaped bracket 7 is mounted on the support member 5 and is free to rotate thereon. More particularly, the support member 5 extends through the two legs 7a of the bracket. The bracket 7 carries an upstanding dog 8, having a notch 9 formed in its rear vertical edge. The bracket 7 also has attached thereto a forwardly projecting pan or trigger 10. The upper arm 2 has a closed eye 11 formed at its forward end. When the upper arm 2 is forced down to the position shown in FIG. 2, where it substantially parallels the lower arm 3, the bracket 7 may be rotated to cause the notch 9 of the dog 8 to engage the eye 11. In this situation, the arms 2, 3 are releasably locked together by the dog 8 and the pan 10 extends forwardly and is elevated relative to the ground.

If an animal steps on the pan 10 and causes it to rotate downwardly, the dog 8 connected to its is rotated forwardly, thereby releasing the upper arm 2. The coil spring 4 causes the released upper arm 2 to snap to the upwardly directed position shown in FIG. 1.

A cable assembly 12 is provided to complete the trap. The cable assembly 12 comprises a swivel connector 13 at its inner end. This connector 13 comprises a ring 14, mounted on the lower arm 3, and a swivel 15 defining an opening 16. The ring 14 is free to slide along the lower arm 3 a short distance between a stop 14a and the support member 5. A fast-opening link 17 extends through the swivel opening 16 and connects with one end of the cable 18. From the foregoing, it will be noted that one end of the cable 18 is thus secured to the free end of the lower arm 3.

The cable 18 extends through the upper arm eye 11 and is retained thereby, although the body of the cable is free to slip therethrough.

At its forward end, the cable 18 is doubled back and connected by a jam lock 19 to the main body of the cable, to form a slip noose 20.

A chain or cable 21 is provided to tie the trap 1 to an anchor, such as the tree 22.

Figure 2:
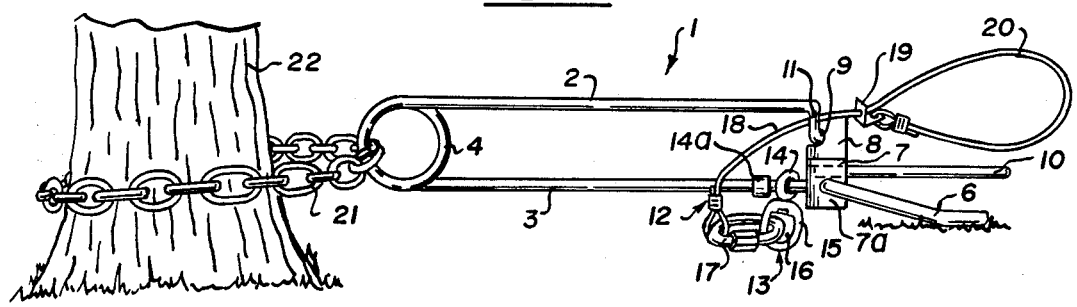
FIG. 2 is a side view of the trap with its arms in the cocked or locked position and connected to an anchoring tree by a chain.
Figure 3:
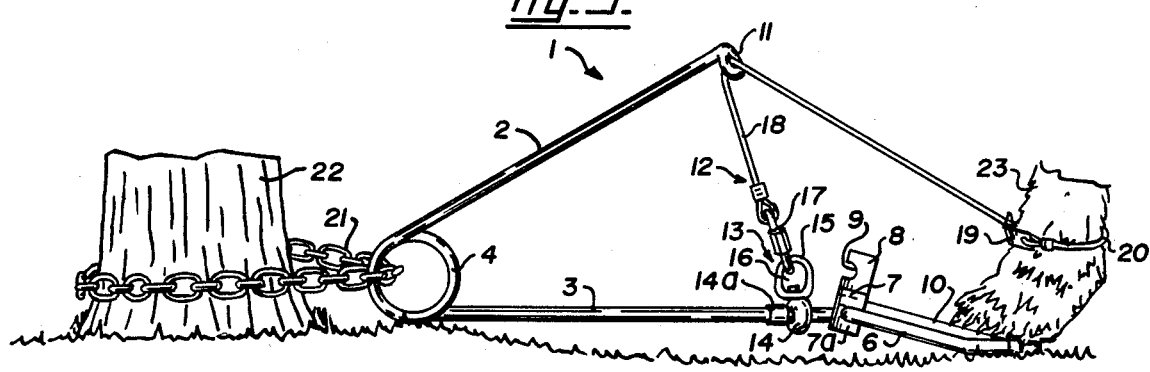
FIG. 3 is a side view showing the trap in a sprung condition with an animal's paw snared.

When being set, with the parts cocked as in FIG. 2, the trap will usually be located in a narrow trench dug into the snow; when in place, it is covered with loose snow. The slip noose 20 is arranged to surround and overlie the pan 10. When the animal's paw 23 presses down on the pan 10, the upper arm 2 is released and springs upwardly, throwing the noose 20 up onto the leg and simultaneously drawing it tight. In the essential feature of the invention, the inner end of the cable 18 remains fixed to the free end of the lower arm 3 while its body remains connected slidably to the free end of the angularly disposed upper arm 2. Thus the arms 2, 3 and coil 4 act as a resilient resister between the noose 20 and the tree 22.

The scope of the invention is now defined by the claims which follow.

The embodiments of the invention in which an exclusive property or privilege is claimed are defined as follows:

1. A foot snare live trap for snaring the paw of an animal, comprising:
   upper and lower arms connected at their first ends by a resilient coil spring, said arms being adapted to assume a wide angled disposition when the coil spring is relaxed;
   a catch support member connected with the lower arm at its second end;
   rotatable catch means, mounted on the catch support member, for disengageably locking the upper arm to the lower arm in a generally parallel arrangement with the coil spring in a tensioned condition, said catch means comprising a U-shaped bracket having a pair of spaced legs through which the support member extends, whereby the bracket may rotate on the support member, said bracket carrying a notched dog member for engaging the upper arm to lock it in the parallel arrangement;
   trigger means, extending forwardly from the catch means and connected therewith, for releasing said catch means when said trigger means is stepped on and rotated by an animal;
   means for supporting the outer end of the lower arm so that it is elevated relative to the ground, whereby there is clearance for the trigger means to perform its releasing function;
   said upper arm having a closed loop at its second end for retaining a cable while permitting it to slip therethrough; and
   a cable assembly, securable to the second end of the lower arm, and comprising a cable for extending through the closed loop, said assembly comprising means at its outer end for forming the cable into a slip noose to overlie the trigger means;
   whereby, when a snared animal pulls on the noose end of the cable assembly, the cable assembly remains attached to the free ends of the arms and is operative to pull them toward each other against the resistance of the coil spring.

2. The trap as set forth in claim 1 wherein:
   the elevating means comprises one or more legs extending downwardly from the catch support member at a small angle from horizontal, whereby the legs rest on the ground surface in use but are not buried in it and yet provide the required clearance.

3. The trap as set forth in claim 2 wherein:
   a stop is secured to the lower arm a short distance inwardly from the catch support member;
   the cable assembly comprises a swivel member, secured to the lower arm between the stop and the catch support member, and a link attached to the swivel member, said link being attached to one end of the cable; and
   said cable assembly further comprises a jam lock for securing the other end of the cable to the cable body to form the slip noose.

* * * * *